US010334207B2

(12) United States Patent
Clavel et al.

(10) Patent No.: US 10,334,207 B2
(45) Date of Patent: *Jun. 25, 2019

(54) AUDIO VIDEO STREAMING SYSTEM AND METHOD

(71) Applicant: Rabbit, Inc., Redwood City, CA (US)

(72) Inventors: Philippe Clavel, San Francisco, CA (US); Timophey Zaitsev, San Francisco, CA (US); Stefan Birrer, San Francisco, CA (US); Alexandre Francois, San Francisco, CA (US)

(73) Assignee: Rabbit, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,532

(22) Filed: Dec. 12, 2017

(65) Prior Publication Data
US 2018/0103235 A1 Apr. 12, 2018

Related U.S. Application Data

(63) Continuation of application No. 15/181,362, filed on Jun. 13, 2016, now Pat. No. 9,843,767, which is a (Continued)

(51) Int. Cl.
*H04N 7/15* (2006.01)
*H04L 29/06* (2006.01)
(Continued)

(52) U.S. Cl.
CPC .......... *H04N 7/15* (2013.01); *H04L 12/1822* (2013.01); *H04L 12/1831* (2013.01);
(Continued)

(58) Field of Classification Search
CPC .... G06F 17/30038; H04N 7/15; H04N 7/152; H04N 7/147; H04L 51/32
(Continued)

(56) References Cited

U.S. PATENT DOCUMENTS 8,587,634 B1 * 11/2013 Baldino .................. H04N 7/15
348/14.08
8,749,610 B1 * 6/2014 Gossweiler ......... H04L 12/1827
348/14.08
(Continued)

*Primary Examiner* — Gerald Gauthier
(74) *Attorney, Agent, or Firm* — Baker Botts L.L.P.

(57) ABSTRACT

In one embodiment, a method includes sending, to client computing devices that are each associated with a particular user identifier, conversation-group information that identifies a conversation group. The conversation-group information includes a user identifier of a first user of the conversation group. The user identifier of the first user is associated with a first one of the client computing devices. The conversation-group information also includes a server identifier of a streaming server for the conversation group. The method includes receiving, from the first one of the client computing devices, a first audio stream and a first video stream. The method includes receiving, from each of one or more of the client computing devices other than the first one of the client computing devices, a request to access the conversation group. The method includes receiving, from each of one or more of the client computing devices other than the first one of the client computing devices, a second audio stream and a second video stream.

20 Claims, 6 Drawing Sheets

Related U.S. Application Data continuation of application No. 14/134,330, filed on Dec. 19, 2013, now Pat. No. 9,369,670.

(60) Provisional application No. 61/739,554, filed on Dec. 19, 2012.

(51) Int. Cl.
  *H04N 21/4788* (2011.01)
  *H04L 12/18* (2006.01)
  *H04N 21/258* (2011.01)

(52) U.S. Cl.
  CPC ........ *H04L 65/4038* (2013.01); *H04L 65/604* (2013.01); *H04N 7/152* (2013.01); *H04N 21/25891* (2013.01); *H04N 21/4788* (2013.01)

(58) Field of Classification Search
  USPC ........... 379/202.01; 348/14.08, 14.09, 14.12; 463/25; 705/319; 706/52; 709/203, 204, 709/206, 224; 455/412.1, 414.1; 714/38.1
  See application file for complete search history.

(56) References Cited

U.S. PATENT DOCUMENTS

| | | | | |
|---|---|---|---|---|
| 9,843,767 | B2* | 12/2017 | Clavel | H04L 12/1831 |
| 2003/0212746 | A1* | 11/2003 | Fitzpatrick | H04L 12/1827 |
| | | | | 709/206 |
| 2004/0203608 | A1* | 10/2004 | Osann, Jr. | H04L 12/2854 |
| | | | | 455/412.1 |
| 2007/0238447 | A1* | 10/2007 | Balestrieri | H04W 76/45 |
| | | | | 455/414.1 |
| 2008/0177752 | A1* | 7/2008 | Kulkarni | G06F 17/30038 |
| 2008/0288582 | A1* | 11/2008 | Pousti | G06Q 30/04 |
| | | | | 709/203 |
| 2010/0036912 | A1* | 2/2010 | Rao | H04L 51/20 |
| | | | | 709/204 |
| 2010/0097441 | A1* | 4/2010 | Trachtenberg | H04N 7/142 |
| | | | | 348/14.08 |
| 2010/0100618 | A1* | 4/2010 | Kuhlke | H04L 43/00 |
| | | | | 709/224 |
| 2010/0114788 | A1* | 5/2010 | White | G06Q 30/02 |
| | | | | 705/319 |
| 2011/0167114 | A1* | 7/2011 | Blanchard, III | G06Q 10/10 |
| | | | | 709/204 |
| 2012/0069137 | A1* | 3/2012 | Thapa | H04N 7/15 |
| | | | | 348/14.08 |
| 2012/0197986 | A1* | 8/2012 | Chen | G06Q 30/00 |
| | | | | 709/204 |
| 2012/0202587 | A1* | 8/2012 | Allen | G07F 17/3223 |
| | | | | 463/25 |
| 2012/0303706 | A1* | 11/2012 | Young | G06Q 50/01 |
| | | | | 709/204 |
| 2014/0032475 | A1* | 1/2014 | Evans | G06N 5/048 |
| | | | | 706/52 |
| 2014/0064471 | A1* | 3/2014 | Krishnan | H04M 3/567 |
| | | | | 379/202.01 |
| 2014/0118474 | A1* | 5/2014 | Fluhr | H04L 65/403 |
| | | | | 348/14.09 |
| 2014/0168354 | A1* | 6/2014 | Clavel | H04N 7/152 |
| | | | | 348/14.09 |
| 2018/0103235 | A1* | 4/2018 | Clavel | H04L 65/604 |

* cited by examiner

AUDIO VIDEO STREAMING SYSTEM AND METHOD

PRIORITY CLAIM

This application is a continuation under 35 U.S.C. § 120 of U.S. patent application Ser. No. 15/181,362, filed 13 Jun. 2016, which is a continuation under 35 U.S.C. § 120 of U.S. patent application Ser. No. 14/134,330, filed 19 Dec. 2013, which claims priority to U.S. Application No. 61/739,554 filed 19 Dec. 2012, which is incorporated in its entirety by this reference.

TECHNICAL FIELD

This invention relates generally to the social media field, and more specifically to a new and useful conversation room in the social media field.

BACKGROUND

The private, insular nature of conventional video conversation rooms preclude discovery of new users and new content. By limiting the audio and video of each conversation to only that of the conversation room participants, the conversation room participants have no knowledge, nor ability to discover, simultaneous conversations that could be more interesting to said participant.

However, the system architecture of conventional video-conferencing or gaming systems inherently precludes such discovery. Conventionally, videoconferencing has been either peer-to-peer or has been supported by a state server that manages the state of the user, receives the audio and/or video streams of the user, and determines and sends the user audio and video streams to the proper recipients. This architecture does not scale past approximately 100 audio and video streams, at which point another server must be added to the system in order to accommodate for additional users. However, the users on the second server cannot collaborate with the users supported by the first server because the second server is not tracking the state of the users on the second server. The conventional system architecture effectively limits user discovery to the content that is supported by the respective server, and precludes user discovery of content supported by other servers.

Thus, there is a need in the conversation room field to create a new and useful conversation room that promotes immersion and discovery.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
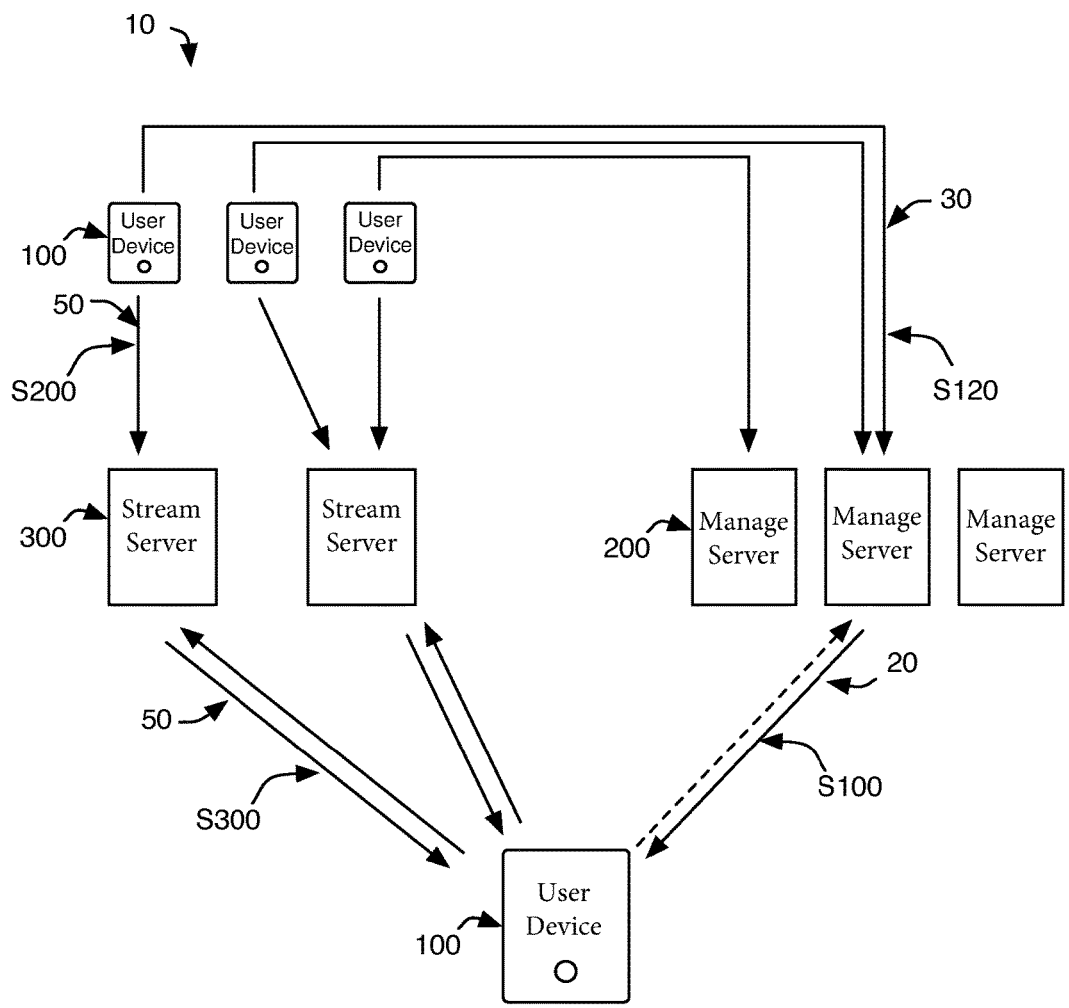
FIG. 1 is schematic representation of a system and method for facilitating audio-video conferencing between a plurality of participants.

As shown in FIG. 1, the method for video conferencing between a plurality of participants includes sending conversation group information from a managing server to a user device S100, receiving participant audio and video streams from a set of user devices at a set of streaming servers S200, and sending the participant audio and video streams from the set of streaming servers to the user device in response to a streaming request from the user device S300. The method functions to enable users within a conversation group can stream the respective audio and video streams to different streaming servers while the managing server stores and tracks the association between the users and the conversation groups. The method can additionally or alternatively include, at the device: receiving status information for a set of participants at the device, requesting the audio and video streams for the participants from the respective streaming servers associated with each of the set of participants, receiving the requested audio and video streams from the streaming servers, and playing the received audio and video at the device.

The method functions to facilitate video conferencing, video chatting, or any other suitable audio-video communication between a plurality of users, and can be implemented by a video conferencing system. The method functions facilitate one or more video conversation sessions (conversation rooms, chat rooms), wherein each video conversation room is capable of supporting video chatting between among a large number of participants. Each participant of a conversation room is preferably capable of simultaneously listening to and/or watching the audio and video stream of any other participant within the conversation room. Each conversation room preferably supports audio and/or video sharing between an unlimited number of participants, but can alternatively support audio and/or video sharing between 100 or more users, 500 or more users, 1000 or more users, or any other suitable number of users. Each conversation room preferably includes one or more conversation groups (chat groups). When in a conversation group, a user is preferably capable of clearly hearing the audio streams of the other users within the group and/or the audio tracks of content shared within the group. The user is preferably additionally capable of hearing, less discernibly, the audio streams of nearby groups while in the group, thereby emulating a real-world room experience. The user is preferably additionally capable of hearing, even less discernibly, the ambient room stream and general room chatter while in the group. In one variation, the method is capable of simultaneously streaming over 30 live audio and video streams (e.g., over 100 live audio and video streams, over 5,000 live audio and video streams, etc.) to a given user and rendering the over 30 live audio and video streams at the user device with audio and video synchronization. However, the method is capable of streaming more audio and video streams to a user than the typical limit imposed by the bandwidth of the user (e.g., more streams than if each audio and video stream of each conversation group participant were to be streamed to the user). The audio and video streams can be rendered at speeds of over 60 frames per second, but can alternatively be rendered at 15 frames per second, 30 frames per second, or at any other suitable speed.

The method additionally functions to promote user and/or content discovery within a conversation room. As the inventors have discovered, the addition of an ambient audio stream (e.g., room tone) and/or a room chatter stream can promote user interaction by providing background noise to a conversation. The method can additionally function to share the visual and/or audio components of content, and can additionally function to facilitate interaction with or around the shared content. The shared content can be audio and/or video captured and streamed from a microphone and/or camera connected to the device of the user, respectively. The shared content can additionally be content accessible from a browser (e.g., content that can be streamed from the internet), content on a device (e.g., an application running on the device or a portion of a device display), or any other suitable content accessible through the computer.

Sending conversation group information from the set of managing servers to a user device 8100 functions to send the information required by the device to present the audio and/or video for one or more conversation groups. The conversation group information sent by the managing server preferably includes the user identifiers of the participants in the conversation group (e.g., the active participants that are sharing audio and/or video in the conversation group) and the streaming server identifiers associated with the user identifiers, but can additionally or alternatively include any other suitable conversation group information as described above. The conversation group information for a single conversation group is preferably stored and sent by a single managing server, but can alternatively be stored and sent from multiple managing servers. The multiple managing servers can be synchronized through a caching service or system (e.g., memcache, redis, etc.), synchronized in any other suitable manner, or remain unsynchronized. For example, the information for each participant of the conversation group can be stored on different managing servers, wherein the user information of each user includes the conversation group that the user is currently associated with. In response to the request, the system (e.g., managing server receiving the request, second server, etc.) queries other managing servers for user information of participants of the conversation room. The managing server(s) preferably sends information for one or more conversation groups in response to receipt of a request that is sent by the device. The request can include an identifier for the device (e.g., device identifier, device address), a user identifier for the user associated with the device, a number of conversation groups for which information is requested (e.g., wherein the number of conversation group requested is in excess of the display quantity, or the number of conversation groups that can be displayed by the device, wherein the number of conversation groups requested is equal to the display quantity, etc.), the network connection conditions for the device, user preferences (e.g., filtering preferences, such as keywords, topics, content parameters, etc.), user state information (e.g., whether the user is idle, active, signed in, the substantially instantaneous user virtual location, the conversation rooms or conversation groups that the user has visited, etc.), specific conversation group identifiers, or any other suitable information that can be used by the managing server to determine which conversation groups for which information should be sent to the device.

Figure 5:
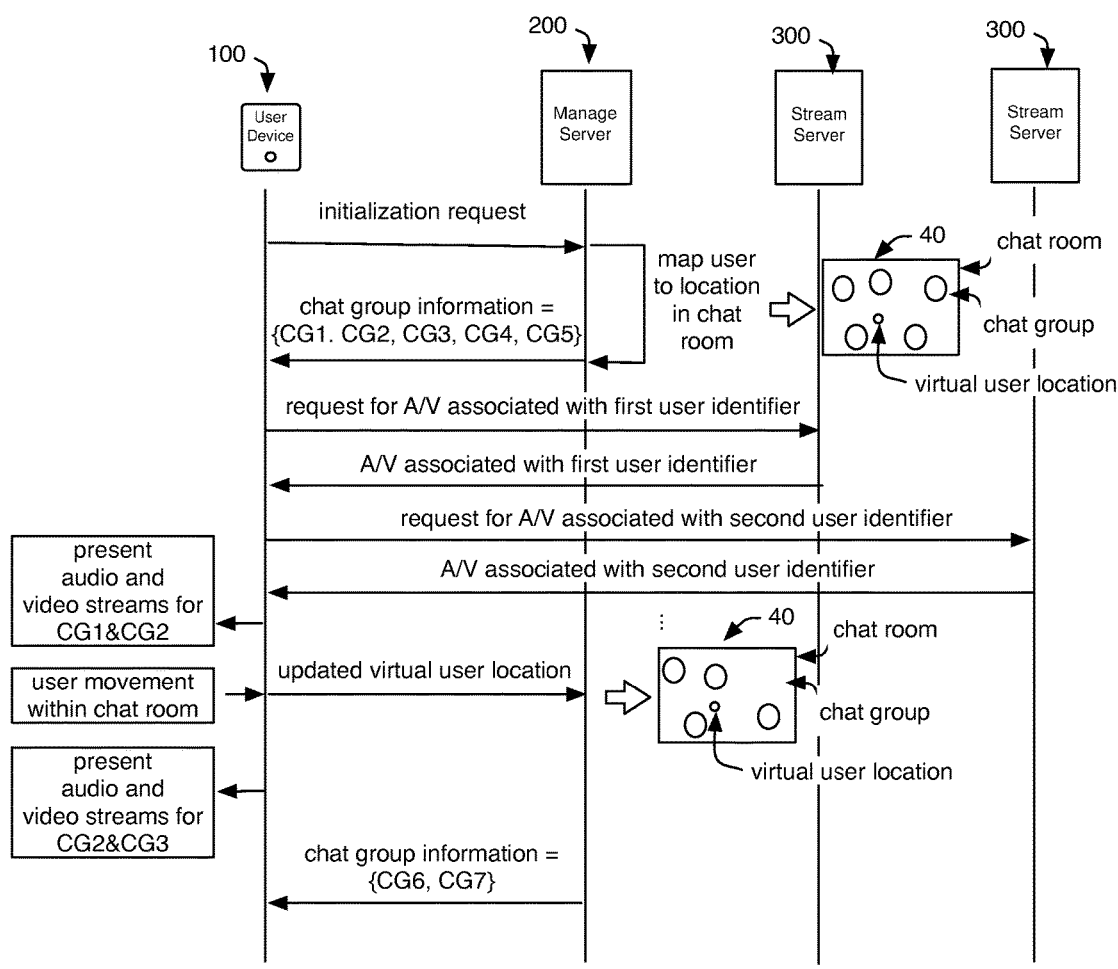
FIG. 5 is a schematic representation of a variation of the method wherein the managing server maintains a virtual conversation room for the user.

Sending the conversation group information from the managing server to the device S100 can additionally include selecting a conversation group for which information is to be sent to the device. Selecting the conversation group can include selecting a conversation group based on user preferences (e.g., as stored, determined from user history, or received), wherein conversation groups having a similarity score (e.g., as calculated from keyword similarity, content type similarity, etc. between the conversation group and the user preferences) above a predetermined threshold are selected. Selecting a conversation group can alternatively include selecting conversation groups within a predetermined virtual distance from the virtual user location. This variation can be used in a variation of the method wherein the managing server maintains the conversation group positions within a conversation room (e.g., as shown in FIG. 5). The predetermined virtual distance is preferably a display distance, wherein the display distance can be a virtual measurement (e.g., within 10 virtual meters of the virtual user location), a number of conversation groups (e.g., wherein conversation groups within a 2-conversation group radius are selected), or any other suitable distance or increment. Selecting the conversation group can alternatively include randomly selecting the conversation groups from the plurality of conversation groups within the conversation room. However, the conversation groups can be selected in any other suitable manner.

Figure 2:
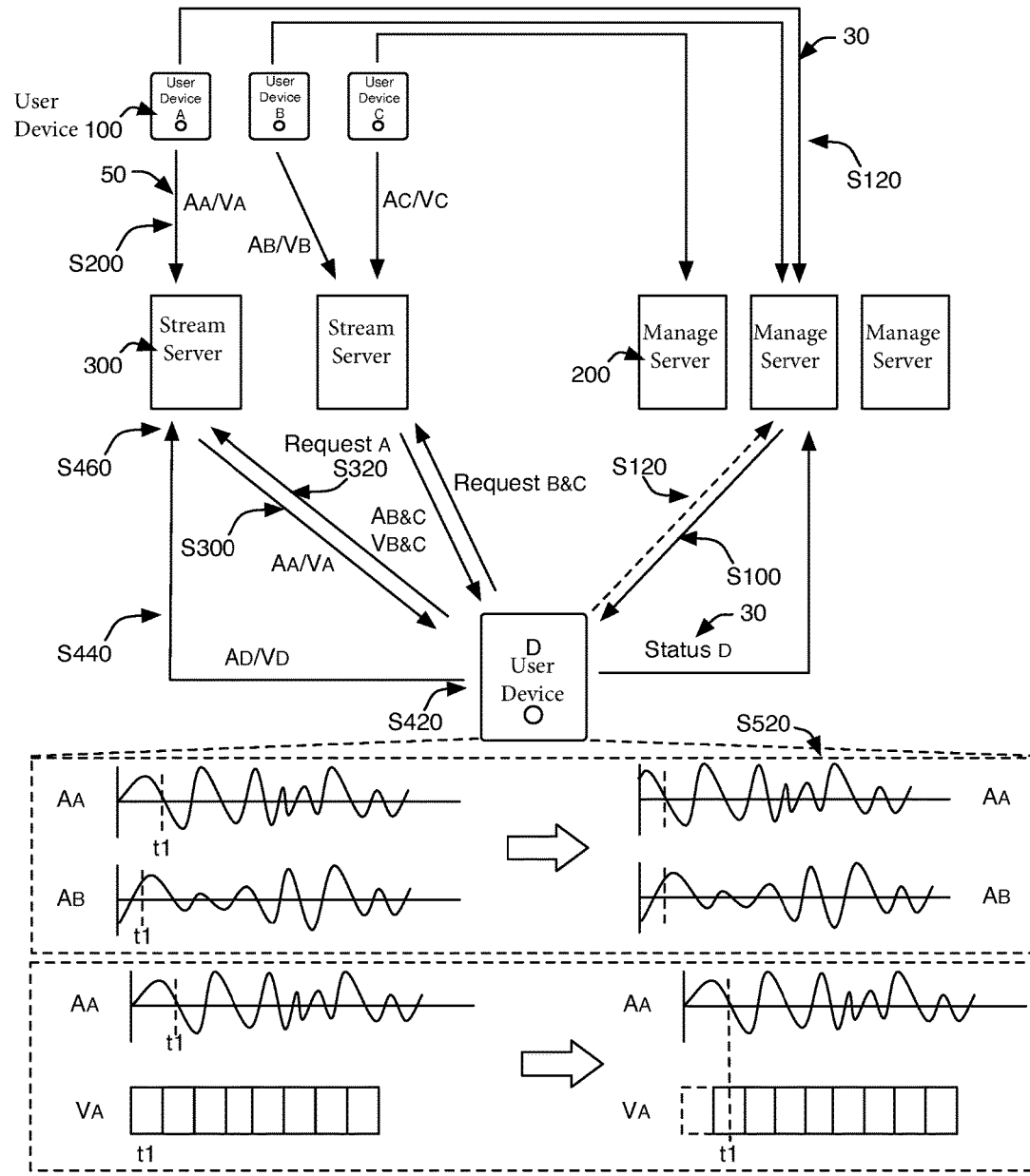
FIG. 2 is a schematic representation of a specific variation of the method.
Figure 3:
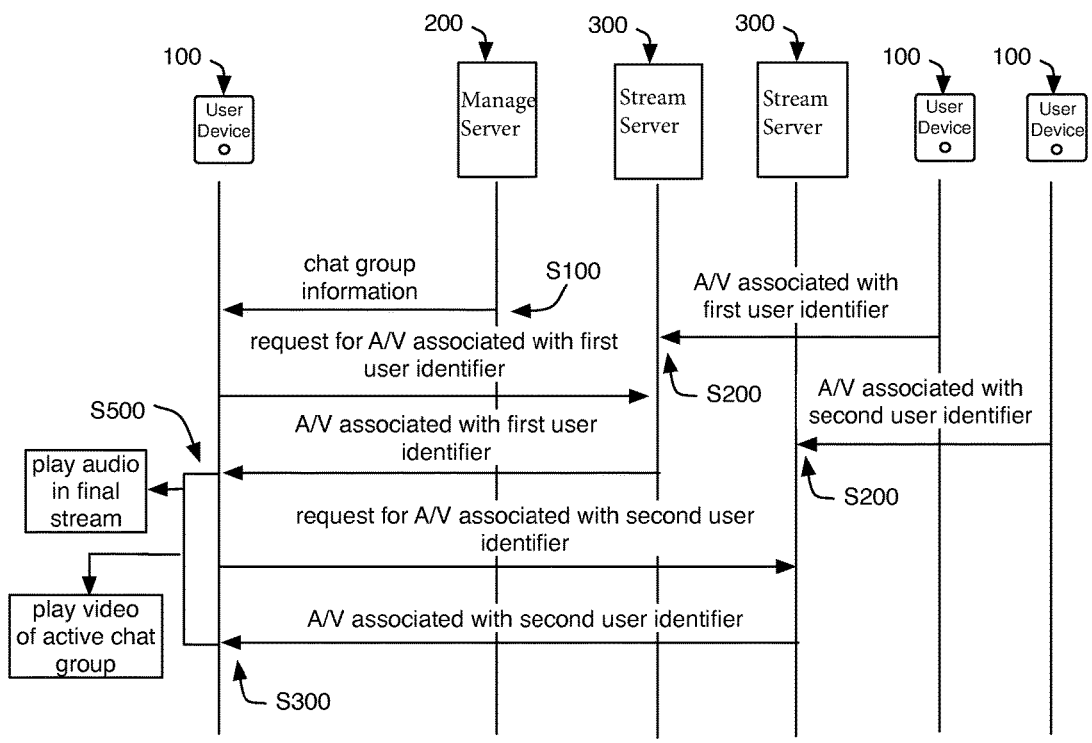
FIG. 3 is a schematic representation second variation of the method.

Sending the participant status information from a managing server to a user device 8100 can additionally include monitoring participant status information with a set of managing servers S120 (e.g., as shown in FIG. 2), which functions to determine the conversation group information to be sent to the user device. Monitoring the participant status information can additionally function to generate a record or history of user actions. Monitoring the participant status information can additionally include determining user preferences from the record of participant status information. Monitoring the participant status information can additionally include determining the presentation parameters for each audio and video stream to be retrieved and presented at the device (e.g., audio mixing instructions, video display parameters, etc.), and sending the presentation parameters to the device. The participant status information is preferably monitored by the managing server, but can alternatively be monitored by any other suitable computing device.

Participant status information that is monitored can include whether the user is logged in (e.g., whether the user identifier is logged in), which conversation room identifier the user identifier is associated with (e.g., which conversation room the user is in), which conversation group identifier the user identifier is associated with (e.g., which conversation group the user is in), the streaming server identifier for the streaming server to which the audio and/or video stream of the user is being sent, the duration of user participation in a given conversation room or conversation group, the connection quality of the user (e.g., network conditions of the user), and/or the virtual user location within the virtual conversation room and/or virtual space including multiple conversation rooms. The participant status information can additionally include content parameters, such as the type of content shared by the user (e.g., associated with the user identifier), the frequency, duration, and volume of user speech, video parameters (e.g., lighting, colors, video quality), or any other suitable content parameter. The content parameters can be received by the managing server from the user device (e.g., wherein the user device determines and sends the content parameters) or received from the streaming server (e.g., wherein the streaming server analyzes the information received from the user device). The participant status information can additionally include user-selected preferences, such as the display quantity (e.g., the number of conversation groups that can be simultaneously displayed on the device, as determined by the device or by device limitations), the display quality, conversation group filtering preferences (e.g., based on keywords, personas, other users, etc.), or any other suitable information. The user actions are preferably received and sent to the managing server by the user device. The participant status information can be sent to the server in response to receipt of a user action (e.g., a conversation group selection, a participant selection, user scrolling, data entry, etc.), or a set of new user actions can be sent at a predetermined frequency to the server.

The participant status information can be used to generate a history of user actions, which can be analyzed to generate conversation room or conversation group recommendations for future user sessions. In one example, the conversation group identifier and/or the conversation room identifier that the user is currently participating in is preferably received and recorded by the managing server. In another example, the conversation group identifier and/or conversation room identifier that the user has previewed (e.g., listened to and/or watched, but has not participated in by sending audio and video to the respective conversation group participants) is received and stored by the managing server. In the variation of the method wherein the managing server maintains the virtual map of the conversation room the participant status information can additionally function to determine the virtual user location within the conversation group, and which participants' audio and video streams should be retrieved by the device (e.g., which conversation group information should be sent to the device).

In a first variation of the method, the device retrieves all audio and video for multiple conversation groups or conversation rooms. The device determines the conversation group focus (e.g., which conversation group to present clear audio and to display all participant videos for) based on one or more user actions received at the device. The device records the conversation group identifier of or the user or identifiers associated with the conversation group in focus, and sends the conversation group identifier or user identifiers to a server, more preferably the managing server. The identifiers can be sent in response to change in conversation group or conversation room focus (e.g., new focus) or periodically (e.g., at predetermined frequency). The method can additionally include the server system sending the device previously unsent conversation group information (e.g., new conversation group information) in response to receipt of information indicative of the change in focus. In one example, conversation group information for a new set of conversation groups can be sent to the device, wherein the device replaces all the conversation groups that are not in focus or the conversation groups for which a video is not displayed with the new set of conversation groups. In another example, conversation group information for a single new conversation group is sent to the device, wherein the device replaces a low priority conversation group (e.g., the conversation group recently left by the user, the conversation group that has not been visited by the user, a random conversation group, etc.) of the set of conversation groups to be presented to the user with the new conversation group information. However, information for any other suitable number of conversation groups can be sent. This variation can have the benefit of minimizing the load time between conversation group switching, at the cost of increased bandwidth usage due to the receipt of unpresented audio and video streams at the device.

In a second variation of the method, the device only receives the information for and only retrieves the audio and video that for conversation groups that it will concurrently display. New conversation group information can be sent to the device in response to receipt of a user action (e.g., a selection of a conversation group, scroll, etc.). In this variation, the user actions are preferably sent to the server in response to receipt of the respective user action, but can alternatively be sent at any other suitable frequency.

Monitoring the participant status information can additionally include determining the user preferences (e.g., which conversation groups the user prefers, conversation group parameters shared by the conversation groups that have been visited by the users, etc.) from the participant status information. The participant status information can be used to determine user habits and user preferences, which can influence the conversation groups that are recommended to the user in subsequent user sessions. For example, identifiers for the conversation rooms and conversation groups that the user has previously visited can be sent in response to a request for conversation groups received from the user device. In another example, the attributes of the previously attended conversation groups and/or conversation rooms (e.g., keywords, tags, number of participants, participant profiles, etc.) can be analyzed to determine new conversation groups and/or conversation room recommendations for the user, wherein identifiers for the new conversation groups and/or conversation rooms can be sent to the user in response to receipt of a request from the user device. The participant status information can additionally be used to determine optimal audio and video stream transmission and receipt resolution and/or quality. For example, the managing server(s) can determine that a first user's Internet connection has a first set of network conditions and a second user's connection has a second set of network conditions that are worse than the first set of network conditions, based on the network condition parameters received from the first and second user device, respectively. The managing server can send the first device the second set of network conditions or other streaming instructions in addition to the second user's identifier and streaming server identifier, such that the first device can accommodate for the lower network quality (e.g., by sending lower-resolution audio and video to the server). This can have the benefit of reducing the bandwidth required by the first device. This can be performed in real time as network conditions change during user use, can be batched, or can be otherwise performed.

Receiving participant audio and video streams from the set of user devices at a set of streaming servers 8300 functions to receive the audio and video streams that are associated with user identifiers (e.g., the audio and video stream for a user). The audio and video streams for participants of a given conversation group can be received at different streaming servers, or can be received at the same streaming server. The audio stream and video stream for a first user identifier are preferably received at the same streaming server, but can alternatively be received at different streaming servers. The streaming server that receives the audio and video streams of the first user is preferably assigned by the managing server upon user identifier sign-on (e.g., based on streaming server availability, streaming server physical proximity to the user, etc.), but can alternatively be permanently assigned to the user identifier, assigned based on the physical geographic location of the user or user connection, assigned based on any other suitable user metadata, or otherwise determined. Receiving the audio and/or video streams can additionally include buffering the audio and/or video stream, performing error correction on the audio and/or video stream, retransmitting lost packets, or otherwise processing the received audio and/or video stream. Receiving the audio and video streams can additionally include synchronizing the audio and video streams at the streaming server, for example based on the timestamps associated with each audio and video frame. Receiving the audio stream from a plurality of devices can additionally include mixing one or more audio streams (e.g., all the audio streams, a subset of all audio streams received at the server, only audio streams that were received from a native audio input device, etc.) into a room chatter stream. However, receiving the audio and video stream can include processing the audio and/or video stream in any other suitable manner.

Receiving audio and video streams preferably includes capturing the audio and video streams by the device 8420, sending the audio and video streams to a server 8440, and receiving the audio and video streams at the streaming server 8460, for example, as shown in FIG. 2. Capturing the audio and video streams preferably includes capturing the audio and video streams from a microphone and camera associated with a user device, respectively. Alternatively, the audio and video streams can be captured from the audio and video streams of shared content. In one variation, the shared content includes content streamed from the Internet, wherein the captured audio stream is the streamed audio of the content, and the captured video stream is the streamed video of the content. More preferably, the shared content can be directly streamed from a third party source (e.g., from the Youtube servers), but can alternatively be streamed to the device prior to streaming to the streaming server. In another variation of the method, the shared content includes content native to the device (e.g., an native application run on the device), wherein the captured audio stream is the audio stream generated by the native application and/or an audio stream captured from the microphone, the audio from the device itself (e.g., audio stored on the device, audio from a separate application on the device, etc.), and/or audio captured from a digital default audio output. The captured video stream can be captured from the native application to be shared through an API or other programming interface. Sending the audio and video streams to the server can include the device sending the captured audio and video streams wirelessly to the server (e.g., through WiFi, cellular networks, Bluetooth, etc.) or over a wired connection to the server (e.g., LAN connection). The audio and video streams can alternatively be sent using any suitable data transfer technologies. Sending the audio and video streams can additionally include compressing the audio and video streams, imbedding or associating data (e.g., metadata, such as an identifier, the network conditions of the device connection, etc.) with the audio and video streams, or otherwise processing the audio and video streams. The audio and video streams can additionally be processed. For example, echo cancellation can be performed on the audio stream, and video filtering, such as smoothing (e.g., frame rate adaption), can be performed on the video stream. The audio and video streams are preferably sent as two separate streams, but can alternatively be sent together. The audio and video streams are preferably sent through a native application running on the device, but can alternatively be sent by an application or a set of applications installed by the user or a third party, or through an external hardware device or application. The server preferably receives the audio and videos streams, and can additionally decompress the audio and video streams, extract any imbedded information, or otherwise process the received audio and video streams.

Sending the participant audio and video streams from the set of streaming servers to the user device S300 in response to receipt of a streaming request sent from the user device functions to send the audio and video streams of a participant of the conversation room or conversation group to the device. The streaming request includes the user identifiers for which the audio and video streams are to be sent. The streaming request can additionally include an audio and video stream quality selection (e.g., wherein the streaming server processes the audio and/or video to reduce quality for faster streaming and/or lower bandwidth consumption), wherein the quality selection can be specific to a requested user identifier (e.g., audio and video of a first quality is requested for a first user identifier and audio and video of a second quality is requested for a second user identifier), specific to a subset of requested user identifiers, or universal to all user identifiers. The streaming server preferably sends the audio and video streams corresponding to the requested user identifiers to the device from which the request was received, and can additionally process the audio and/or video stream to meet the parameters received in the request. The streaming request can additionally include a request for an ambient audio stream, wherein the streaming server can select an ambient audio stream or track from digital memory and send the ambient audio stream or track to the device. The streaming request can additionally include a request for the room chatter stream, wherein the streaming server can additionally send the room chatter stream to the device. The audio and video streams are preferably streamed from the set of streaming servers, but can alternatively be streamed from any other suitable server. Alternatively, the audio and/or video stream from a first device associated with a first user can be relayed by one or more streaming devices to the receiving devices. The audio and/or video stream is preferably streamed as a full stream, but can alternatively be divided into segments (e.g., chunked). Processed audio and/or video streams are preferably sent to the device, but the audio and/or video streams can alternatively be sent in raw form (e.g., as received). The audio and/or video streams can be mixed with other audio and/or video streams, respectively, by the streaming server to form composite audio and/or video streams. The composite audio and/or video stream is preferably mixed prior to request receipt, but can alternatively be mixed in response to request receipt, wherein the composite audio and/or video stream can be mixed according to mixing instructions within the request. The composite audio and/or video stream is preferably sent to the device, but the audio and/or video streams can alternatively be sent as independent streams. The component audio and/or video streams within a composite audio and/or video stream are preferably inseparable from the other component audio and/or video streams. Alternatively, the composite audio and/or video stream can be tagged with metadata or otherwise augmented with information about the component audio and/or video streams, such that the device can remove or adjust one or more components of a mixed stream after receipt. Different composite audio and/or video streams can be sent to different devices, or the same composite audio and/or video stream can be sent to multiple devices.

In one variation of the method, a streaming server(s) sends all received audio and video streams to the device, wherein the device filters the audio and video streams for the relevant audio and video streams, generates a room chatter stream from the audio streams, identifies audio and video streams associated with the active group, identifies audio and video streams associated with adjacent group, and mixes the active group audio streams, adjacent group audio streams, room chatter stream, and ambient audio stream into an audio output. In another variation, the streaming server(s)

sends a room chatter stream and all the audio and video streams associated with the conversation room or conversation group to the device, wherein the device filters the audio streams associated with the conversation room to extract the audio and video streams associated with the active group and the audio and video streams associated with adjacent groups, and generates an audio output from the ambient audio stream, the room chatter stream, and the extracted audio streams. In another variation, the state server sends the room chatter stream and the audio and video streams of identified users in response to the receipt of the request from the device. The device preferably receives the audio and video streams, identifies the user identifiers of the participants in the active conversation group, mixes the audio streams of the identified user identifiers into an adjacent audio stream and a conversation group audio stream, selects or mixes a representative video stream for each of the adjacent conversation groups, displays the video streams of the identified user identifiers and the representative video streams, and plays the room chatter stream, the adjacent audio stream, and the conversation group audio stream. In another variation, the streaming server(s) sends the ambient audio stream, a room chatter stream, a pre-mixed group chatter stream for each adjacent group, and the individual audio and video streams of the users within the group.

The method can additionally include receiving the conversation group information from the managing server at the device, retrieving audio and video streams associated with the conversation group information from the streaming server, processing the audio and video streams according to a conversation group priority S500, and presenting the audio and video streams to the user S600. The conversation group information is preferably received by the device in response to a request sent by the device. The device can receive conversation group information for one or more conversation groups or conversation rooms. The device can receive the conversation group information from one or more managing servers. The conversation group information received from the managing server preferably includes at least a conversation group identifier, the user identifiers associated with a conversation group and the streaming server from which the audio and video streams for the user identifier can be retrieved. For example, the device can receive conversation group information for a first conversation group, wherein the conversation group information includes a first user identifier associated with a first streaming server identifier and a second user identifier associated with a second streaming server identifier. In a first variation of the method, the device determines the identifiers for conversation groups that the user had previously participated in, and requests the conversation group information for the conversation group identifiers. In another variation of the method, the device determines filtering parameters for the user based on the user profile and preferences (e.g., user-set or determined from past participation in conversation groups), and sends the filtering parameters to the managing server. The managing server preferably selects conversation groups based on the filtering parameters and returns the selected conversation groups. In another variation of the method, the managing server that manages the information for the user determines the filtering parameters or past conversation group identifiers for the user, and automatically selects conversation groups for which the conversation group information is sent. In another variation of the method, the device requests information for conversation groups that the user has selected. However, the conversation groups for which information is sent can be otherwise determined.

Retrieving audio and video streams from the streaming server functions to retrieve the audio and video streams for presentation to the user. Retrieving the audio and video streams preferably includes sending a retrieval request 8320 (e.g., as shown in FIG. 2), including the user identifier that was received from the managing server, to the streaming server that was identified by the streaming server identifier associated with the respective user identifier. For example, the device can send a first request including the first user identifier to the first streaming server identified by the first streaming server identifier and send a second request including the second user identifier to the second streaming server identified by the second streaming server identifier. The request can be for an audio stream associated with the user identifier, a video stream associated with the user identifier, or the audio and video streams associated with the user identifier. The request can additionally include processing instructions (e.g., mixing instructions, stream quality instructions, etc.) or any other suitable information. Retrieving the audio and video streams can additionally include selecting a streaming server from which to retrieve the room chatter stream. The streaming server that provides the room chatter stream can be randomly selected, be the server from which most of the audio and video streams are being retrieved, or be selected in any other suitable manner. Alternatively, the room chatter stream can be retrieved from all or a subset of the streaming servers that provide the individual users' audio and video streams.

Figure 4:
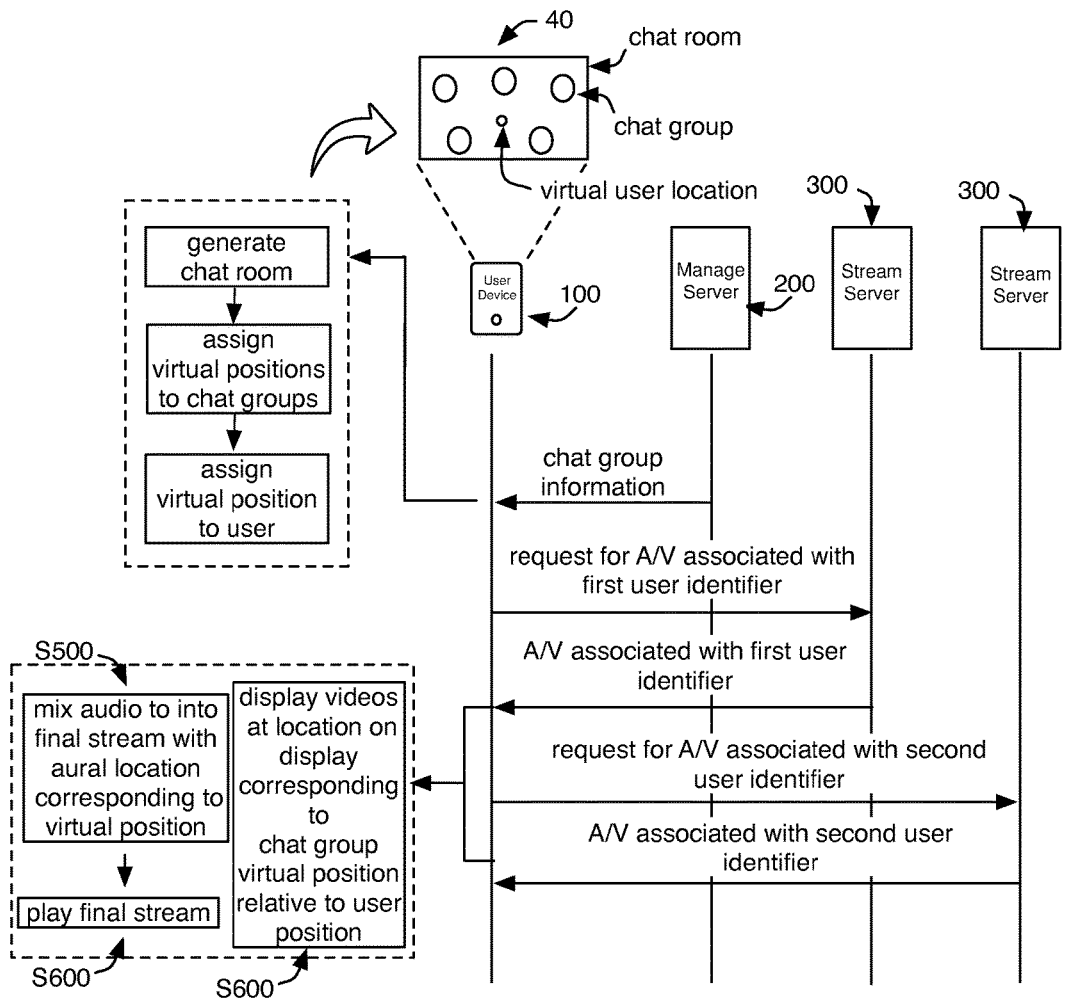
FIG. 4 is a schematic representation of a variation of the method wherein the device maintains a virtual conversation room for the user.

Processing the audio and video streams according to a conversation group priority 8500 functions to place focus on the active conversation group(s) while permitting the user to passively participate in adjacent conversation groups by listening in or watching a representative video stream. Processing the audio and video streams preferably includes determining a conversation group priority. The priority of each conversation group is preferably determined by the device, but can alternatively be determined by the managing server and sent with the conversation group information. The conversation group priority can be based on the similarity between the conversation group and the user, based on the virtual distance between the virtual user location and the conversation group location, or based on any other suitable parameter. The active conversation group (e.g., the conversation group in which the user is sharing the audio and/or video) is preferably given highest priority. In a first variation of the method, the device creates and maintains a virtual conversation room for the user, an example of which is shown in FIG. 4. The device preferably determines a virtual position of each conversation group relative to the user, wherein the virtual position of each conversation group can be randomly determined, organized according to relevance to the user (e.g., wherein more relevant conversation groups are arranged closer to the user), or otherwise organized. The closer the conversation group to the user, the higher priority the conversation group. In another variation of the method, the managing server(s) creates and maintains the virtual conversation room, wherein the virtual conversation room can be specifically for the user or be a universal conversation room. The user is assigned a virtual user location by the managing server. The conversation groups within a given virtual distance of the user are sent to the device, and the respective conversation group priorities vary inversely with distance away from the user (e.g., closer conversation groups are given higher priority). However, the priority of each conversation group can be otherwise determined.

Processing the audio and video streams can additionally include mixing the multiple audio streams, which functions to generate an audio output. The multiple audio streams are preferably mixed by the device, more preferably by the native application running on the device, but can alternatively be mixed by a server. The multiple audio streams are preferably mixed such that the audio output includes, in order of decreasing discernibility: the audio streams associated with the active group, the audio streams associated with adjacent groups, the room chatter stream, and the ambient audio stream. The device preferably determines which conversation group is the active conversation group and which conversation groups are the adjacent conversation groups and determines the mixing instructions based on the assignments, but can alternatively receive mixing instructions from the managing server. The audio streams are preferably processed to achieve a predetermined level of discernibility, and layered to generate the audio output. Audio stream processing preferably includes adjusting the audio stream volume (e.g., increased volume to achieve a higher level of discernibility, decreased volume to achieve a lower level of discernibility), adjusting the jitter, adjusting the reverberation, adjusting the equalization, passing the audio stream through a low pass filter, passing the audio stream through a high pass filter, scrambling the audio stream, or otherwise processing the audio stream. The predetermined level of discernibility for each audio stream is preferably determined by the native application based on user actions (e.g., where a cursor is located, any user selections, etc.). Mixing can additionally include mixing a stereophonic stream in which the composite audio streams have an aural position corresponding to the respective virtual positions of the conversation groups, with which the streams are associated, relative to the virtual user location.

In one variation of the method, when an audio stream associated with the active group is determined to include content audio by the device (e.g., as determined from metadata imbedded within the audio stream, application of filters to determine audio power level, voice signals, random audio signals, etc. by the native application or the streaming server), the discernability of said audio stream is preferably increased, while other audio streams within the active group are preferably decreased m discernability. However, the discernibility of the other audio streams can be subsequently increased depending on the volume (e.g., amplitude), frequency of high-volume noises (e.g., interruptions), or any other suitable parameter of the other audio streams.

In another variation, the audio streams associated with an adjacent group are preferably increased in discernibility and the audio streams associated with the active group are preferably decreased in discernibility in response to a user action. The user action can be rolling a cursor over a video stream associated with said adjacent group, selection of a video stream associated with said adjacent group, user indication of interest in said adjacent group (e.g., watching the adjacent group, as determined by video processing), or any other suitable user action.

In another variation of the method, an audio stream associated with a topic of interest to the user is increased in discernability relative to other audio streams. The audio stream is preferably determined to be associated with a topic of interest to the user when one or more the audio stream parameters exceed a predetermined level of similarity with a stored user profile. Audio stream parameters preferably include keywords extracted from the audio stream using natural language processing, but can additionally include tags imbedded within the audio stream or any other suitable parameter. The audio stream association with a topic of interest to the user is preferably determined by the native application, but can alternatively be determined by a server, more preferably the state server. The resultant audio output preferably includes the relative directionality of said audio stream.

In another variation of the method, when the user is not associated with a group, the audio output preferably includes, in order of decreasing discernibility: the audio streams associated with groups adjacent to the virtual position of the user within the conversation room, the room chatter stream, and the ambient audio stream. The discernability of the audio streams of adjacent groups is preferably adjusted as the user changes virtual positions within the conversation room.

Processing the audio and video streams can additionally include processing the video streams based on the respective conversation group priority. The video streams for conversation groups having higher priority are preferably clearer, larger, or otherwise more discernable than video streams for low priority conversation groups. More participant video streams for higher priority conversation groups are presented than participant video streams for low priority conversation groups. The video streams of participants of the active conversation group can be processed to increase clarity and/or decrease the number of dropped frames. The device can additionally send a request to the streaming server to provide higher-quality video for the active conversation group participant video streams. The video streams of participants of inactive conversation groups are either not shown (e.g., wherein the number of retrieved video streams exceeds the display quantity) or are composited into a representative video stream, which preferably includes the video stream corresponding to the user identifier that is currently speaking or any other suitable video stream.

Figure 6:
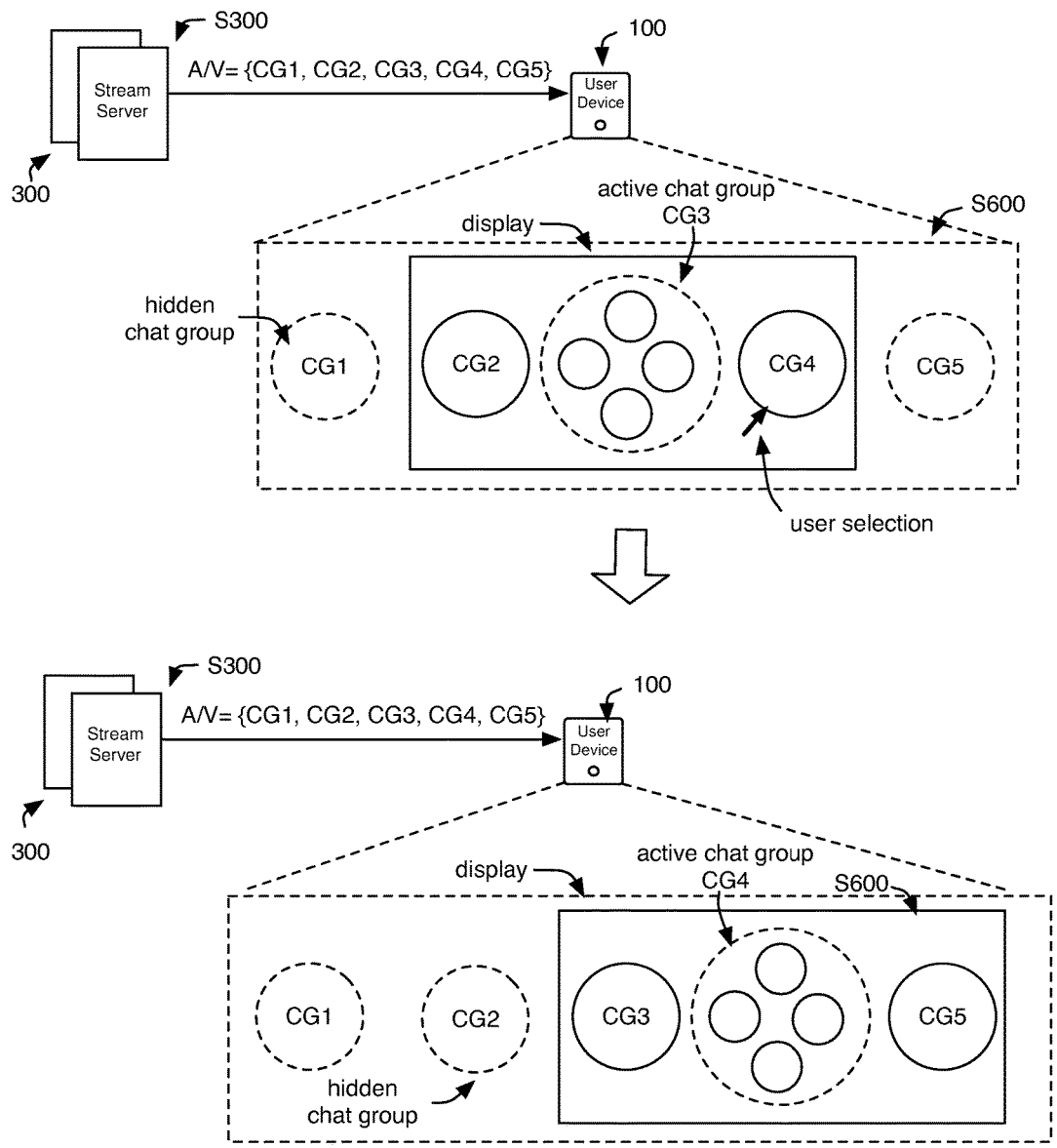
FIG. 6 is a schematic representation of a variation of conversation group display.

Presenting the audio and video streams at the device S600 functions to display the one or more video streams to the user and to play the room chatter stream to the user. Presenting the audio stream to the user preferably includes playing the final stream from an audio output connected to the device, such as a speaker. The final stream preferably includes the room chatter stream and can additionally include an ambient audio stream, and/or individual audio streams of conversation group participants. For example, when the user is not an active participant of any conversation group, the final stream includes the room chatter stream and the ambient audio stream. In response to a user selection of a conversation group, the final stream is dynamically remixed such that the participant audio streams of the selected conversation group are audible and clear (e.g., by including the participant audio streams in the final stream, by dampening the participant audio streams less than before, etc.). One or more retrieved video streams are preferably rendered on a display output connected to the device. The video streams preferably include at least one representative video for each of the displayed conversation groups. The number of displayed conversation groups can be less than or equal to the number of conversation groups for which participant video is retrieved. Alternatively, the device can dynamically request the video of participants in a conversation group from the respective streaming servers in response to receipt of a user selection of the conversation group. The video for all participants within an active conversation group (e.g., a conversation group in which the user is an active participant) is preferably displayed, while a composite video for participants within a non-active conversation group is preferably displayed. The conversation group focus is preferably adjusted in response to receipt of a user selection, wherein the selected conversation group becomes the active conversation group and other conversation groups become inactive conversation groups (e.g., as shown in FIG. 6). However, the audio and video can be presented in any other suitable manner.

The method can additionally include synchronizing the audio stream with the video stream 8520. More preferably, the method includes synchronizing the video stream to the audio stream, wherein the audio stream is prioritized (e.g., video frames are dropped or frozen to match the audio frame). However, the video can be prioritized, wherein audio frames are dropped or frozen until the audio frame timestamp matches the video frame timestamp. The audio and video streams are preferably synchronized by the device (e.g., as shown in FIG. 2), but can alternatively be synchronized by the streaming server. The device is preferably capable of determining the network conditions of the device and/or the network conditions of the streaming devices, and delays the audio or video stream accordingly, such that the audio stream and video stream are substantially in sync. Alternatively and/or additionally, the server can determine the network conditions and/or delay the audio or video stream. The device or server preferably identifies that the audio and video streams are from the same device based on data imbedded in the stream, such as a MAC address, SSRC (synchronization source identifier) or another identifier. The device or server can additionally multiplex the audio and video over one port to reduce the operating system overhead. The network conditions of the device are preferably determined based on data imbedded within the stream (e.g., from metadata), but can alternatively determine the network conditions of the device from the frequency and number of packets received from the device. In one variation, each audio and video frame is time stamped by the device when it is streamed. The device preferably maintains a buffer of the audio and video frames, and selectively displays the synchronous audio and video frames. Asynchronous audio and video frames (e.g., audio or video frames that do not have a concurrent counterpart) are preferably not displayed on the device, wherein the skipped audio frame is preferably replaced with a default signal (e.g., silence). The audio is preferably subsequently passed through a mixer to obtain the audio parameters (e.g., gain, etc.) to smooth the transition back to the streamed audio frames. The audio stream is preferably synchronized with the video stream by the device, but can alternatively be synced by the streaming server or the state server. In one variation of the method, the streaming server receives the audio stream and video stream from the device, synchronizes the video stream to the audio stream, and sends the synchronized streams to the state server. In another variation of the method, the streaming server receives the audio and video streams and sends the streams to the device, wherein the device synchronizes the audio and video streams. However, the audio and video streams can be otherwise synchronized.

The method can additionally include receiving an initiation request at a managing server from the device. The initiation request is preferably sent by the device in response to receipt of an initiation selection from the user (e.g., selection of a "start" button, launching the native application on the device, etc.). The managing server is preferably assigned according to availability, but can be assigned in any other suitable manner. In response to receipt of the initiation request including the user identifier, the method preferably assigns the user identifier to a streaming server identifier and sends the streaming server identifier to the device. Different streaming server identifiers can be provided for the audio and video streams, but one streaming server identifier is preferably provided for both the audio and video streams. The device preferably subsequently streams the audio and video to the streaming server identified by the respective streaming server identifier.

The method can additionally include presenting multiple conversation rooms to the user for selection. In one variation of the method, a conversation room is entirely supported by a single managing server. In this variation, presenting multiple conversation rooms to the user can include selecting a conversation group from each of a set of managing servers and sending the conversation group information to the user. The conversation groups can be selected by the device, automatically determined by the respective managing server, or automatically determined by a higher-level server. In another variation of the method, the conversation room is supported by multiple networked managing servers (e.g., wherein the managing servers store user identifiers in associated with a conversation group and a conversation room, wherein the associated conversation group and conversation room can be dynamically updated). In this variation, presenting multiple conversation rooms to the user can include determining a set of unique conversation room identifiers associated with the plurality of user identifiers stored by the managing servers, selecting a conversation group associated with each of the set of conversation room identifiers, and sending the conversation group information for the selected conversation groups to the device. The set of conversation room identifiers can be determined by the server system or by the device. New conversation groups that are associated with the conversation rooms can be periodically selected, such that the user can hear and see different conversation groups within each conversation room.

The method is preferably performed by a videoconferencing system 10 that includes a managing computing system 200 and a streaming computing system 300. The videoconferencing system can additionally include a device 100. The method is more preferably performed by a videoconferencing system including a plurality of devices, a plurality of managing computing systems, and a plurality of streaming computing systems. The system and method decouples streaming from user state monitoring by using a combination of a managing computing system and a streaming computing system. The computing systems are preferably servers, but can alternatively be other devices, such as in the case of a distributed computing network. However, the method can be performed by any other suitable videoconferencing system.

The device 100 of the system 10 functions to request and receive participant information from the managing server, request and receive the audio and video streams of the participants identified by the participant information from the streaming servers identified by the participant information, and present the received audio and video streams to the user. More preferably, a native application on the device enables device performance of the device functions, but the functions can alternatively be performed by an open browser on the device (e.g., through a browser plug-in, through a web-based browser, etc.), or by any other suitable means. The native application preferably additionally functions to capture and send audio and video streams from the device inputs.

The device 100 is preferably a mobile device, such as a laptop, cell phone, or tablet, but can alternatively be a desktop or any other suitable device capable of receiving an audio and video input from a user and displaying an audio and video stream to the user. The device preferably includes an audio input (e.g., a microphone or internal sound rerouting system), an audio output (e.g., a speaker or audio jack), a video input (e.g., a camera or API to interface with native application APis), and a video output (e.g., a display). However, the device can alternatively include any suitable subset of the aforementioned inputs and outputs. The device preferably additionally includes memory and a processor.

The participant information 20 is preferably information for other participants of a conversation room, of which the user is a participant. The participant information is more preferably information for other participants within the conversation group of which the user is a participant (active conversation group), and can additionally include information for participants of other conversation groups within the same conversation room as the active conversation group. The device can additionally function to capture and stream the audio and video of the user or of media (content) that the user has selected to share. The device is a user device, and is preferably additionally associated with a user identifier that represents the user within the system.

The device 100 can additionally function to mix the multiple audio streams received from the server into one or more final audio streams. The device preferably mixes the audio streams into the final stream based on audio stream parameters or conversation group parameters generated by the device (e.g., in an embodiment wherein the device determines the conversation groups for display and/or the conversation group virtual positioning), based on audio stream parameters or conversation group parameters received from the tracking server, or based on any other suitable parameters received from any other suitable source. The mixed audio stream is preferably a stereophonic or multi-channel audio stream, wherein the aural position of each audio stream preferably corresponds to the virtual position of the conversation group relative to the virtual user location. In one variation of the method, the audio output includes, in order of decreasing discernability (shown in FIG. 5): the audio streams associated with the active group, the audio streams associated with adjacent groups, the room chatter stream, and the ambient stream, wherein the device preferably individually adjusts the relative discernability of each of the aforementioned audio streams and layers the streams to generate the audio output. However, the audio output can have any other suitable mix of audio streams. The room chatter stream is preferably received from the streaming server, but can alternatively be generated by the device. The device preferably additionally displays a set of video streams mapped to the respective virtual position of the associated conversation group while playing the audio output. The set of video streams can be all the video streams received from the streaming server, or be a subset of video streams received from the streaming server (e.g., wherein only the video streams of conversation groups within a display distance, such as within a one-conversation-group radius, is displayed, but more conversation groups than within the display distance is received at the device). The set of displayed video streams preferably includes the video streams associated with participants of the active group and at least one video stream of a participant within an adjacent group. However, any other suitable subset of video streams can be presented. The device can additionally generate and send requests that include identifiers for audio and video streams associated with users within the active group, users within adjacent groups, and/or identifiers for any other suitable audio or video streams.

The device 100 can additionally synchronize the audio stream with the video stream for a given participant. The device can additionally synchronize the audio and video streams of the participants within a conversation group. The device preferably synchronizes the audio and video streams based on the device clock, but can alternatively synchronize the audio and video stream based on the timestamps embedded within the frames of the audio and video streams, or synchronize the audio and video stream based on any other suitable parameter. The audio and video streams are preferably synchronized by dropping or freezing video frames until the timestamps for the audio and video frames substantially match (e.g., within a threshold time period, such as 10 milliseconds), but can alternatively be synchronized by dropping or freezing audio frames. However, the device can mix and/or synchronize the audio and video streams using any other suitable means. The device can additionally synchronize pushes to render the video stream with other participating devices.

The device 100 can additionally create and/or maintain a virtual conversation room for a user. In particular, the device can determine which conversation groups to include in the conversation room and/or determine the virtual position of the conversation group within the conversation room created for the user. The virtual position of the each conversation group is preferably a position relative to the virtual user location, but can alternatively be a position relative to another reference point. The virtual positions of the conversation groups are preferably determined based on the relevance of the conversation group to the user (e.g., includes more than a threshold number of social connections in the conversation group, is tagged with keywords shared or related to keywords within the user preferences, similar to other conversation groups that the user has participated in before beyond a threshold similarity, etc.), but can alternatively be randomly determined, determined based on the relative sizes of the conversation groups, determined based on whether there is media being shared within the conversation group, or based on any other suitable parameter. Conversation groups having high relevance to the user are preferably located proximal the reference location, wherein distance away from the reference location is preferably inversely correlated with conversation group relevance to the user.

The device 100 can additionally processes the captured audio and video streams to prior to sending to the server by tagging or imbedding the audio and video streams with metadata, such as device identifiers, measurements indicative of network conditions (e.g., broadband speeds), and timing information (e.g., a timestamp, etc.).

The managing computing system 200 functions to manage (e.g., track) and retain historical and current state information for a user. The managing computing system is preferably stateful, but can alternatively be stateless. A single managing server preferably supports one or more conversation rooms, wherein the conversation room capacity is limited by the capacity of a single managing server. Alternatively, a single conversation room can be supported across multiple managing servers, thereby enabling the system to support an unlimited number of participants within a given conversation room (e.g., wherein more managing servers are simply added to support the increased number of users). Alternatively, the system can additionally include a third server that functions to monitor which conversation groups are in which conversation rooms, which users are in which conversation rooms, or which conversation groups are in which conversation rooms and communicates the information to the requesting devices or to the managing servers.

The user information 30 (e.g., participant information) that can be tracked by the managing server includes the user identifier for the user, the streaming server identifier for the streaming server or servers to which the user audio and video streams are being streamed, user preferences, user connections (e.g., secondary user identifiers for other participants to which the user identifier is connected), the current user state (e.g., logged in or logged out), the current conversation room that the user is within, the current conversation group that the user is within (e.g., wherein the user identifier is associated with the conversation group identifier), the virtual location of the user within a conversation room or conversation group (e.g., in an embodiment wherein the managing server maintains the conversation rooms and conversation groups), a history of user states, the history of conversation rooms that the user had participated in, the history of conversation groups that the user had participated in, the history of virtual locations within a conversation room or conversation group that the user was in, or any other suitable user information. The managing server additionally functions to receive the current user information from the user (e.g., the user device), and can additionally function to send the user historical user information, historical or current user information for other users, or any other suitable information. The managing server preferably tracks the user actions in substantially real-time, wherein the device preferably sends user requests and actions to the managing server as the actions occur. However, the managing server can track the user actions periodically (e.g., the actions are sent at a predetermined frequency) or intermittently (e.g., the actions are only sent from the device in response to the occurrence of a sending event, such as receipt of an update request from the tracking server, receipt of a user action requiring data beyond that cached by the device, etc.). A single managing server preferably maintains all the information for a user identifier, but the user information for a given user can alternatively be stored across multiple managing servers.

The managing computing system 200 can additionally function to maintain conversation group information. Information for a given conversation group is preferably maintained on a single managing server, but information for the conversation group can alternatively be split and stored across multiple managing servers. Conversation group information can include a conversation group identifier, a conversation room identifier for the conversation room that the conversation group is located in, the user identifiers for the current participants within the conversation group, the user identifiers for the historical participants within the conversation group and their respective participation information (e.g., how long the participant was in the conversation group, what content the participant shared, how long or how loud the participant spoke, etc.). The conversation group information can additionally include conversation group parameters such as access permissions, content permissions (e.g., what content can and cannot be shared), text, audio, and video sharing permissions, conversation group tags (e.g., assigned by users or automatically determined from the conversation group content, such as by extracting keywords from the real-time conversation), or any other suitable conversation group parameter. In a variation of the method and system wherein the managing server maintains the virtual positions of the conversation group within the virtual conversation room space, the conversation group information can additionally include the virtual position of the conversation group.

The managing computing system 200 can additionally maintain a virtual map 40 of a conversation room, wherein the managing server maps each conversation group to a virtual position within a virtual conversation room. The managing server preferably tracks the position of the conversation groups within the conversation room, and can additionally track the virtual location of each participant within the conversation room. The managing server can additionally track the virtual location of each participant within the conversation group. The locations of the conversation groups within the conversation room are preferably the same for every participant within the conversation room (e.g., universal), but can alternatively be different for each participant (e.g., tailored). The conversation group positions can be randomly determined, seeded as each conversation group is created, positioned such that groups of potentially higher interest to the user are positioned closer to the active group, or determined in any other suitable manner. The virtual conversation room is preferably 2-dimensional, but can alternatively be 3-dimensional or have any other suitable number of dimensions.

The managing computing system 200 can additionally function to assign a user to a conversation group and determine which participants' information should be sent to the user device. The managing server can additionally process the user information and provide recommendations for the user. For example, the managing server can recommend conversation groups or conversation rooms that match the user preferences beyond a recommendation threshold (e.g., more than 50% similarity, include one or more shared keywords, etc.), or recommend conversation groups or conversation rooms that are substantially similar to conversation groups or conversation rooms that the user has historically participated in.

The streaming computing system 300 functions to receive and send the audio and video streams 50 for a plurality of participants. The streaming server is preferably stateless and preferably does not maintain a record of user actions or states for the user, but can alternatively be stateful. The system preferably includes a plurality of streaming servers, wherein more streaming servers can be added to the system to support more users. A streaming server preferably receives both the audio and video stream associated with a user identifier associated with a device from which the audio and video stream was received. The streaming server can alternatively receive only the audio or the video stream of the user, wherein the corresponding video or audio stream, respectively, can be sent to a second streaming server. The streaming server preferably sends the audio and/or video stream associated with a user identifier to a device in response to receipt of a request including the user identifier from the device, but can alternatively send the audio and/or video stream associated with the user identifier to the device in response to receipt of any other suitable request.

The streaming computing system 300 can additionally buffer the audio and video streams. Packet losses are preferably accounted for by the streaming server, but can alternatively be accommodated for at the device. The streaming server preferably does not synchronize the audio and video streams associated with the user identifier, can alternatively synchronize the audio and video streams based on the server clock, the timestamps of the audio and video frames, or based on any other suitable parameter. The streaming server can additionally process the audio and video streams, wherein the streaming server can normalize the audio and video streams, introduce effects to the audio and/or video streams, mix the audio stream to reduce overall bandwidth, or otherwise process the audio and/or video streams.

The streaming computing system 300 can additionally send the device an ambient audio track. The ambient audio stream is preferably representative of ambient noise, more preferably of ambient noise within a given space. The ambient audio stream can be an audio track selected from a database, or can be mixed by the streaming server (e.g., room chatter track, etc.). The selected track can be generic, such as white noise, pink noise, or brown noise, but can alternatively or additionally be the ambient noise as recorded within a specific type of space, such as within a concrete warehouse, within a brick warehouse, within a room with hardwood floors, or an ambient sound recording within any other suitable space. The ambient audio stream is preferably a pre-recorded track that is stored within the server, but can alternatively be a stream that is being streamed live, a pre-recorded track that is stored on the device (e.g., in the native application), a pre-recorded track that is stored on the device, or can be any suitable audio track. The streaming server preferably mixes the room chatter stream from the plurality of audio streams received from the plurality of participants, but can alternatively mix the ambient audio stream from any other suitable audio source. The room chatter stream is preferably a processed, layered mix of all the audio streams within a conversation room, wherein the room chatter stream is processed (e.g., passed through a low pass filter or high pass filter, adjusting the jitter, reverberation, or equalization, etc.) to decrease the discernibility of individual audio streams. However, any suitable configuration of servers configured in any suitable manner can be used in the system.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
sending, to a plurality of client computing devices that are each associated with a particular user identifier, conversation-group information that identifies a conversation group, wherein the conversation-group information comprises:
a user identifier of a first user of the conversation group, wherein the user identifier of the first user is associated with a first one of the client computing devices; and
a server identifier of a streaming server for the conversation group;
receiving, from the first one of the client computing devices, a first audio stream and a first video stream;
receiving, from each of one or more of the client computing devices other than the first one of the client computing devices, a request to access the conversation group;
receiving, from each of one or more of the client computing devices other than the first one of the client computing devices, a second audio stream and a second video stream associated with the particular user identifier associated with the client computing device; and
sending, to each of one or more of the client computing devices other than the first one of the client computing devices, in response to the request from the client computing device, the first audio stream, the first video stream, one or more of the second audio streams, and one or more of the second videos streams, wherein before being sent the first and second audio streams are mixed into a final audio stream and the streaming server provides for concurrent display on the client computing device both the first and second video streams.

2. The method of claim 1, wherein:
sending the first audio stream and the second audio stream from the streaming server comprises sending an ambient audio stream; and
mixing the first and second audio streams into a final stream comprises mixing the ambient audio stream into the final stream.

3. The method of claim 2, wherein the streaming server selects the ambient audio stream from an ambient-audio-stream provider.

4. The method of claim 1, further comprising:
receiving, from one of the client computing devices other than the first one of the client computing devices, a request to view a set of conversation groups that the client computing device is permitted to access;
in response to the request to view the set of conversation groups that the client computing device is permitted to access, querying one or more tracking servers to determine the set of conversation groups that the client computing device is permitted to access;
determining video streams associated with the conversation groups in the set of conversation groups that the client computing device is permitted to access;
selecting a representative video stream for each of the conversation groups in the set of conversation groups that the client computing device is permitted to access, wherein each representative video stream comprises a video stream associated with a user identifier of a first user of the conversation group; and
sending, to the client computing device, the representative video streams for concurrent display on the client computing device.

5. The method of claim 4, further comprising selecting, based on user preferences associated with a user of the client computing device, a subset of conversation groups from the set of conversation groups that the client computing device is permitted to access.

6. The method of claim 1, wherein mixing the first and second audio streams into a final audio stream comprises synchronizing the first and second audio streams with each other.

7. The method of claim 1, wherein the first audio stream and first video stream comprise shared content for the conversation group.

8. The method of claim 7, wherein the first user controls the shared content.

9. The method of claim 8, wherein the shared content comprises one or more of:
content streamed from the Internet
content streamed from a third-party source; or
content native to the first one of the client-computing devices.

10. A system comprising:
one or more processors, and
a memory coupled to the processors comprising instructions executable by the processors, wherein the processors are operable when executing the instructions to:
send, to a plurality of client computing devices that are each associated with a particular user identifier, conversation-group information that identifies a conversation group, wherein the conversation-group information comprises:
  a user identifier of a first user of the conversation group, wherein the user identifier of the first user is associated with a first one of the client computing devices; and
  a server identifier of a streaming server for the conversation group;
receive, from the first one of the client computing devices, a first audio stream and a first video stream;
receive, from each of one or more of the client computing devices other than the first one of the client computing devices, a request to access the conversation group;
receive, from each of one or more of the client computing devices other than the first one of the client computing devices, a second audio stream and a second video stream associated with the particular user identifier associated with the client computing device; and
send, to each of one or more of the client computing devices other than the first one of the client computing devices, in response to the request from the client computing device, the first audio stream, the first video stream, one or more of the second audio streams, and one or more of the second videos streams, wherein before being sent the first and second audio streams are mixed into a final audio stream and the streaming server provides for concurrent display on the client computing device both the first and second video streams.

11. The system of claim 10, wherein:
sending the first audio stream and the second audio stream from the streaming server comprises sending an ambient audio stream; and
mixing the first and second audio streams into a final stream comprises mixing the ambient audio stream into the final stream.

12. The system of claim 11, wherein the streaming server selects the ambient audio stream from an ambient-audio-stream provider.

13. The system of claim 10, wherein the processors are further operable when executing the instructions to:
receive, from one of the client computing devices other than the first one of the client computing devices, a request to view a set of conversation groups that the client computing device is permitted to access;
in response to the request to view the set of conversation groups that the client computing device is permitted to access, querying one or more tracking servers to determine the set of conversation groups that the client computing device is permitted to access;
determine video streams associated with the conversation groups in the set of conversation groups that the client computing device is permitted to access;
select a representative video stream for each of the conversation groups in the set of conversation groups that the client computing device is permitted to access, wherein each representative video stream comprises a video stream associated with a user identifier of a first user of the conversation group; and
send, to the client computing device, the representative video streams for concurrent display on the client computing device.

14. The system of claim 13, wherein the processors are further operable when executing the instructions to select, based on user preferences associated with a user of the client computing device, a subset of conversation groups from the set of conversation groups that the client computing device is permitted to access.

15. The system of claim 10, wherein mixing the first and second audio streams into a final audio stream comprises synchronizing the first and second audio streams with each other.

16. The system of claim 10, wherein the first audio stream and first video stream comprise shared content for the conversation group.

17. The system of claim 16, wherein the first user controls the shared content.

18. The system of claim 17, wherein the shared content comprises one or more of:
  content streamed from the Internet
  content streamed from a third-party source; or
  content native to the first one of the client-computing devices.

19. One or more computer-readable non-transitory storage media embodying software that is operable when executed to:
send, to a plurality of client computing devices that are each associated with a particular user identifier, conversation-group information that identifies a conversation group, wherein the conversation-group information comprises:
  a user identifier of a first user of the conversation group, wherein the user identifier of the first user is associated with a first one of the client computing devices; and
  a server identifier of a streaming server for the conversation group;
receive, from the first one of the client computing devices, a first audio stream and a first video stream;
receive, from each of one or more of the client computing devices other than the first one of the client computing devices, a request to access the conversation group;
receive, from each of one or more of the client computing devices other than the first one of the client computing devices, a second audio stream and a second video stream associated with the particular user identifier associated with the client computing device; and
send, to each of one or more of the client computing devices other than the first one of the client computing devices, in response to the request from the client computing device, the first audio stream, the first video stream, one or more of the second audio streams, and one or more of the second videos streams, wherein before being sent the first and second audio streams are mixed into a final audio stream and the streaming server provides for concurrent display on the client computing device both the first and second video streams.

20. The media of claim 19, wherein the software is further operable when executed to:
send the first audio stream and the second audio stream from the streaming server comprises sending an ambient audio stream; and
mix the first and second audio streams into a final stream comprises mixing the ambient audio stream into the final stream.

* * * * *